United States Patent
Odenheimer et al.

(10) Patent No.: US 9,229,993 B2
(45) Date of Patent: Jan. 5, 2016

(54) PROCESSING HYBRID CO-TENANCY IN A MULTI-DATABASE CLOUD

(71) Applicant: SAP AG, Walldorf (DE)

(72) Inventors: Jens Odenheimer, Karlsruhe (DE); Markus Boehm, Ludwigshafen (DE)

(73) Assignee: SAP SE, Walldorf (DE)

( * ) Notice: Subject to any disclaimer, the term of this patent is extended or adjusted under 35 U.S.C. 154(b) by 121 days.

(21) Appl. No.: 13/720,680

(22) Filed: Dec. 19, 2012

(65) Prior Publication Data

US 2014/0172888 A1 Jun. 19, 2014

(51) Int. Cl.
*G06F 17/30* (2006.01)

(52) U.S. Cl.
CPC ................................ *G06F 17/30557* (2013.01)

(58) Field of Classification Search
CPC .................................................. G06F 17/30569
USPC ......................................................... 707/756
See application file for complete search history.

(56) References Cited

U.S. PATENT DOCUMENTS

| | | | | |
|---|---|---|---|---|
| 6,763,347 B1 * | 7/2004 | Zhang | ............................ | 711/117 |
| 7,895,247 B2 * | 2/2011 | Hankin | .......................... | 707/812 |
| 8,271,745 B2 * | 9/2012 | Ware | .............................. | 711/154 |
| 8,504,530 B2 * | 8/2013 | Namini | ......................... | 707/690 |
| 8,615,528 B2 * | 12/2013 | Shah | .............................. | 707/783 |
| 2003/0158842 A1 * | 8/2003 | Levy et al. | ......................... | 707/3 |
| 2005/0033777 A1 * | 2/2005 | Moraes et al. | ................ | 707/202 |
| 2010/0131461 A1 * | 5/2010 | Prahlad et al. | ................ | 707/609 |
| 2012/0173515 A1 * | 7/2012 | Jeong et al. | .................... | 707/718 |
| 2013/0254144 A1 * | 9/2013 | Heidasch | ......................... | 706/13 |

* cited by examiner

*Primary Examiner* — Scott A Waldron
*Assistant Examiner* — Dongming Wang
(74) *Attorney, Agent, or Firm* — Fountainhead Law Group PC (57) ABSTRACT

In one embodiment, the present invention includes a computer-implemented method comprising monitoring a first condition of an in-memory database. An in-memory data store stores an in-memory database. The method further comprises determining whether the first condition of the in-memory database meets a first defined criterion. If the first condition of the in-memory database meets the first defined criterion, the in-memory database is stored in a persistent data store as a storage based database. If a received query is a query of the storage based database, the query is executed using the storage based database. Metadata of the in-memory database is mapped into a metadata repository if the in-memory database is stored in the in-memory data store. Metadata of the in-memory database is remapped in the metadata repository if the in-memory database is stored in the persistent data store as the storage based database.

11 Claims, 7 Drawing Sheets

PROCESSING HYBRID CO-TENANCY IN A MULTI-DATABASE CLOUD

BACKGROUND

The present invention relates to computing, and in particular, to systems and methods for processing hybrid co-tenancy in a multi-database cloud.

Enterprise application software companies provide in-memory applications to customers via the cloud. Operating in-memory databases in the cloud face severe obstacles due to the size of memory that the database consumes. An operational tenant concept for a database with large memory consumption is difficult and always includes performance or security compromises. Hence, the cost of operations is very high.

One problem associated with this approach is that tenancy of large data consumers in an in-memory database is handled by swapping the unused tables out to a persistency layer (e.g., disk) and swapping the tables back into the in-memory database when they are needed. This swapping may take some time. It is generally desirable for customers to process their databases in the cloud without long delays. However, because service level agreements or other constraints may limit performance of the customers, some swapping to the persistency layer may be agreed to. Consequently, there exists a need for improved systems and methods for processing databases in a cloud. The present invention addresses this problem, and others, by providing systems and methods for processing multiple databases in a cloud.

SUMMARY

Embodiments of the present invention include systems and methods for processing hybrid co-tenancy in a multi-database cloud. In one embodiment, the present invention includes a computer-implemented method comprising monitoring, by a controller, a first condition of an in-memory database, wherein an in-memory data store stores the in-memory database. The method further comprises determining, by the controller, whether the first condition of the in-memory database meets a first defined criterion. The method further comprises if the first condition of the in-memory database meets the first defined criterion, storing, by the controller, the in-memory database in a persistent data store as a storage based database; and receiving a query in the controller. The method further comprises if the query is a query of the storage based database, executing, by the controller, the query using the storage based database.

In one embodiment, the method further comprises mapping metadata of the in-memory database into a metadata repository if the in-memory database is stored in the in-memory data store, and remapping metadata of the in-memory database in the metadata repository if the in-memory database is stored in the persistent data store as the storage based database.

In one embodiment, the method further comprises reading the metadata in the metadata repository for executing the query.

In one embodiment, the method further comprises monitoring, by the controller, a second condition of the storage based database, determining, by the controller, whether the second condition of the storage based database meets a second defined criterion; and if the second condition of the storage based database meets the second defined criterion, storing, by the controller, the storage based database in the in-memory data store as the in-memory database.

In one embodiment, the method further comprises remapping metadata of the storage based database to the in-memory database if the storage based database is stored in the in-memory database.

In one embodiment, the first condition is a level of usage of the in-memory database.

In one embodiment, the second condition is a level of usage of the storage based database.

In one embodiment, the first condition is a time period.

In one embodiment, the second condition is a time period.

In one embodiment, the storing, by the controller, the in-memory database in a persistent data store as a storage based database further comprises exporting user context from the in-memory database, importing the user context into the storage based database, and switching user flags in a metadata repository corresponding to the user context.

In another embodiment, the present invention includes a computer readable medium embodying a computer program for performing a method and embodiments described above.

In another embodiment, the present invention includes a computer system comprising one or more processors implementing the techniques described herein. For example, the system includes a controller that monitors a first condition of an in-memory database. An in-memory data store stores in-memory database. The controller determines whether the first condition of the in-memory database meets a first defined criterion. If the first condition of the in-memory database meets the first defined criterion, the controller further stores the in-memory database in a persistent data store as a storage based database, receives a query in the controller, and if the query is a query of the storage based database, the controller executes the query using the storage based database.

In one embodiment, the controller further maps metadata of the in-memory database into a metadata repository if the in-memory database is stored in the in-memory data store. The controller further remaps metadata of the in-memory database in the metadata repository if the in-memory database is stored in the persistent data store as the storage based database.

In one embodiment, the controller further monitors a second condition of the storage based database. The controller further determines whether the second condition of the storage based database meets a second defined criterion, and, if the second condition of the storage based database meets the second defined criterion, stores the storage based database in the in-memory data store as the in-memory database.

The following detailed description and accompanying drawings provide a better understanding of the nature and advantages of the present invention.

DETAILED DESCRIPTION

Described herein are techniques for processing hybrid co-tenancy in a multi-database cloud. The apparatuses, methods, and techniques described below may be implemented as a computer program (software) executing on one or more computers. The computer program may further be stored on a computer readable medium. The computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
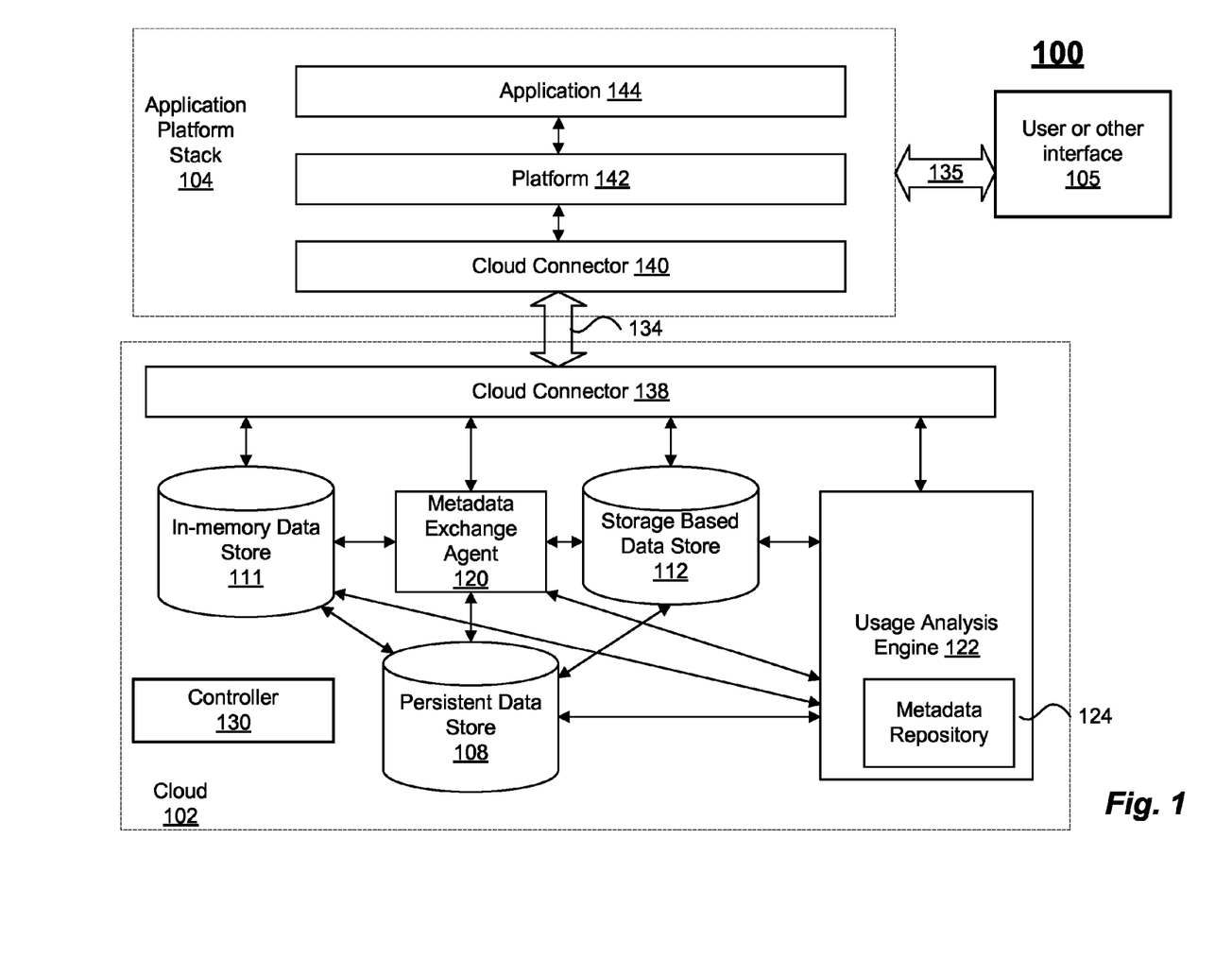
FIG. 1 is a schematic representation of a system for processing hybrid co-tenancy in a multi-database cloud according to an embodiment of the present invention.

FIG. 1 is a schematic representation of a system 100 for processing hybrid co-tenancy in a multi-database cloud according to an embodiment of the present invention. System 100 includes a cloud system 102, an application platform stack 104, and a user or other interface 105. In the following description, cloud system 102 is used interchangeably with cloud 102. Application platform stack 104 includes the hardware, application, and interface of a user or customer of cloud 102.

Information is conveyed between cloud 102 and application platform stack 104 along data flow path 134. Information is conveyed between user interface 105 and application platform stack 104 along data flow path 135.

User or other interface 105 is a collection of one or more data input/output devices for interacting with a human user or with another data processing system to receive and output data. For example, interface 105 can be a presentation system, one or more software applications, or a data communications gateway, for example. Data flow path 135 is data communicated over interface 105 that retrieves data from or causes a change to data stored in cloud 102. Such changes include the insertion, deletion, or modification of all or a portion of the contents of cloud 102. Data output over interface 105 can present the results of data processing activities in system 100. For example, data flow paths 134 and 135 can convey the results of queries or other operations performed by cloud 102 for presentation on a monitor or a data communications gateway.

Cloud 102 comprises a persistent data store 108, an in-memory data store 111, a storage based data store 112, a metadata exchange agent 120, a usage analysis engine 122, a metadata repository 124, a controller 130, and a cloud connector 138. Persistent data store 108 may comprise one or more data stores.

Persistent data store 108 is a collection of information that is stored at one or more data machine readable storage devices (e.g., data stores). Persistent data store 108 may be a single data store or multiple data stores, which may be coupled to one or more software applications for storing application data. Persistent data store 108 may be formed of a memory having slower read, write, and access time than that of in-memory data store 111. Persistent data store 108 may store data as a plurality of data records. Each data record comprises a plurality of data elements (e.g., fields of a record). Persistent data store 108 may include different structures and their relations (e.g., databases, data store tables, data records, fields, and foreign key relations). Additionally, different structures and fields may include data types, descriptions, or other metadata, for example, which may be different for different data records. Persistent data store 108 may store data used for metadata exchange agent 120, usage analysis engine 122, metadata repository 124, and application platform stack 104. Data flow path 134 conveys information describing changes to data stored in persistent data store 108 between application platform stack 104 and persistent data store 108. Such changes include the insertion, deletion, and modification of all or a portion of the contents of one or more data stores.

In-memory data store 111 is a collection of information that is stored at one or more data machine readable storage devices (e.g., data stores). In-memory data store 111 may store data that is stored in persistent data store 108 for use by one or more software applications. In-memory data store 111 may be formed of a memory having faster read, write, and access time than that of persistent data store 108 and storage based data store 112. In-memory data store 111 may reside in portions of cloud 102 or main memory so that data processing on a database stored in in-memory data store 111 is executed at a faster rate than execution would be on the database if the database were stored in persistent data store 108. In some embodiments, in-memory data store 111 is stored in main memory (e.g., RAM, flash memory, and the like) as opposed to disk storage such as hard disk drives, thus increasing data look-up performance. In-memory data store 111 may be a single data store or multiple data stores, which may be coupled to one or more software applications for storing application data. In-memory data store 111 may store data as a plurality of data records. Each data record comprises a plurality of data elements (e.g., fields of a record). In-memory data store 111 may include different structures and their relations (e.g., data store tables, data records, fields, and foreign key relations). Additionally, different structures and fields may include data types, descriptions, or other metadata, for example, which may be different for different data records. In-memory data store 111 may store data used for metadata exchange agent 120, usage analysis engine 122, metadata repository 124, and application platform stack 104. Data flow path 134 conveys information describing changes to data stored in in-memory data store 111 between application platform stack 104 and in-memory data store 111. Such changes include the insertion, deletion, and modification of all or a portion of the contents of one or more data stores. In some embodiments, data flow paths may also be between in-memory data store 111 and persistent data store 108. In some embodiments, data flow paths may also be between in-memory data store 111 and storage based data store 112.

Storage based data store 112 is a collection of information that is stored at one or more data machine readable storage devices (e.g., data stores). In some embodiments, storage based data store 112 is part of persistent data store 108. In some embodiments, storage based data store 112 is part of main memory. Storage based data store 112 may store databases that are moved from in-memory data store 111 as described below. Storage based data store 112 may be a single data store or multiple data stores, which may be coupled to one or more software applications for storing application data. Storage based data store 112 may store data as a plurality of data records. Each data record comprises a plurality of data elements (e.g., fields of a record). Storage based data store 112 may include different structures and their relations (e.g., databases, data store tables, data records, fields, and foreign key relations). Additionally, different structures and fields may include data types, descriptions, or other metadata, for example, which may be different for different data records. Storage based data store 112 may store data used for metadata exchange agent 120, usage analysis engine 122, metadata repository 124, and application platform stack 104. Data flow path 134 conveys information describing changes to data stored in storage based data store 112 between application platform stack 104 and storage based data store 112. Such changes include the insertion, deletion, and modification of all or a portion of the contents of one or more data stores. In some embodiments, data flow paths may also be between storage based data store 112 and persistent data store 108.

Metadata exchange agent 120 is a collection of data processing activities (e.g., one or more data analysis programs or methods) performed in accordance with the logic of a set of machine-readable instructions. The data processing activities can include processing metadata of data and databases stored in persistent data store 108, in-memory data store 111 and storage based data store 112, and stores the metadata in metadata repository 124. When data is transferred between persistent data store 108, in-memory data store 111, and storage based data store 112, metadata exchange agent 120 changes the metadata to reflect the relocation of the data. The change may be, for example, switching flags in metadata repository 124.

Usage analysis engine 122 is a collection of data processing activities (e.g., one or more data analysis programs or methods) performed in accordance with the logic of a set of machine-readable instructions. The data processing activities can include analyzing the usage by application platform stack 104 of persistent data store 108, in-memory data store 111, and storage based data store 112. The usage may be, for example, quantity of processing used, size of databases, time, and terms of use (e.g., contractual, such as a service level agreement). If usage analysis engine 122 determines that usage satisfied predetermined or specified criterion, criteria, condition, or conditions, controller 130 may initiate action, such as transfer databases between in-memory data store 111 and persistent data store 108. As noted above, such transfer may be processed by metadata exchange agent 120 to change metadata.

Metadata repository 124 stores metadata of data and databases stored in 108, in-memory data store 111 and storage based data store 112 during execution of a software application by application platform stack 104.

Instructions from metadata exchange agent 120, usage analysis engine 122, or application platform stack 104 may be received by controller 130. In some embodiments, metadata exchange agent 120 or usage analysis engine 122 or both are part of controller 130. Controller 130 may be a component on the same system as a data store or part of a different system and may be implemented in hardware, software, or as a combination of hardware and software, for example. Controller 130 receives an instruction from metadata exchange agent 120, usage analysis engine 122, or application platform stack 104, and generates one or more requests based on the received instruction depending on the data stores 108, 111 and 112 and data sets that are to be accessed. Data stores 108, 111 and 112 transform the request from controller 130 into an appropriate syntax compatible with the data store.

Controller 130 receives data from data stores 108, 111 and 112. In responding to the instruction from metadata exchange agent 120, usage analysis engine 122, or application platform stack 104, controller 130 may perform an operation or function on the data sets from data stores 108, 111 and 112. Controller 130 returns the data to metadata exchange agent 120, usage analysis engine 122, or application platform stack 104 in response to the instruction. In various embodiments, controller 130 executes the SAP® HANA computing platform In some embodiments, system 100 is used in any application that includes a significant number of application items related to each other, or within the context of the user's specific objective, the users enterprise or business network, or the user in general. System 100 may be used in applications having relationships between the elements along a certain dimension that are in a hierarchical or network pattern. System 100 may be used in various application domains, such as supply chain visibility, resource planning, human capital management, goal management, customer relationship management, or process control systems.

Application platform stack 104 comprises a cloud connector 140, a platform 142, and an application 144. Platform 142 is a hardware computer or processor, such as computer system 710 (FIG. 7) that executes a set of machine-readable instructions.

Cloud connector 138 and cloud connector 140 are interfaces to data flow path data flow path 134 for communication between cloud 102 and application platform stack 104, respectively. In some embodiments, data flow path 134 uses a Hypertext Transfer Protocol Secure (HTTPS) protocol.

Application 144 is a collection of data processing activities (e.g., one or more data analysis programs or methods) performed in accordance with the logic of a set of machine-readable instructions and executed by platform 142. The data processing activities can include database operations on databases stored in persistent data store 108, in-memory data store 111, and storage based data store 112. Application 144 runs on platform 142 and connects to an analytics service or other application operating in cloud 102. Application 144 sends a query through cloud connector 140, data flow path 134, and cloud connector 138 to cloud 102. Controller 130 communicates with metadata repository 124 to determining the mapping of the database (e.g., persistent data store 108, in-memory data store 111, or storage based data store 112) for that particular application. Controller 130 redirects the query accordingly.

Figure 2:
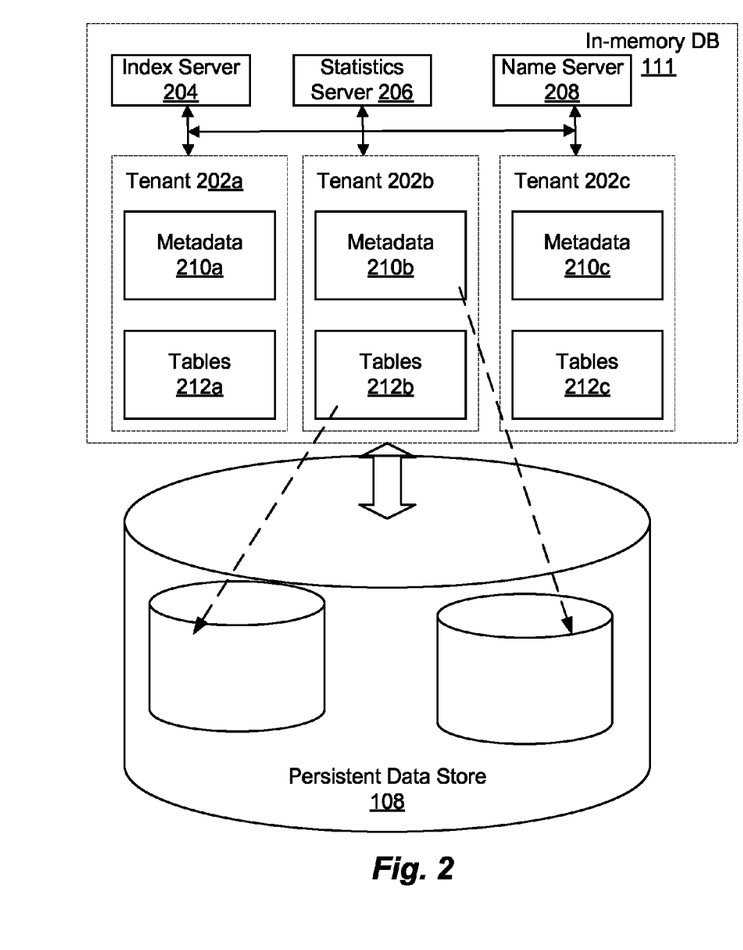
FIG. 2 is a schematic representation of an illustrative embodiment of a persistent data store and an in-memory data store of the system of FIG. 1.

FIG. 2 is a schematic representation of an illustrative embodiment of persistent data store 108 and in-memory data store 111. In-memory data store 111 includes an index server 204 that uses an index of the database for performing operations on the database. In-memory data store 111 also includes a statistics server 206 that generates alerts for system 100 when resource usage and statistical thresholds are violated. In-memory data store 111 also includes a name server 208 for processing names of databases to prevent naming conflicts.

In an illustrative embodiments, three users are each running a corresponding application platform stack 104 that uses a corresponding database that is retrieved from persistent data store 108 and stored in in-memory data store 111 as tenants 202a, 202b and 202c. Metadata 210a, 210b, and 210c are stored for tenants 202a, 202b and 202c, respectively. Tables 212a, 212b, and 212c are stored for tenants 202a, 202b and 202c, respectively.

Controller 130 monitors usage of in-memory data store 111 of each tenant 202 based on statistics server 206 or on certain conditions, such as time of day. If predetermined criterion or criteria are met for a tenant 202, controller 130 moves the corresponding in-memory database (e.g., the database for tenant 202b) from in-memory data store 111 to persistent data store 108.

Figure 3:
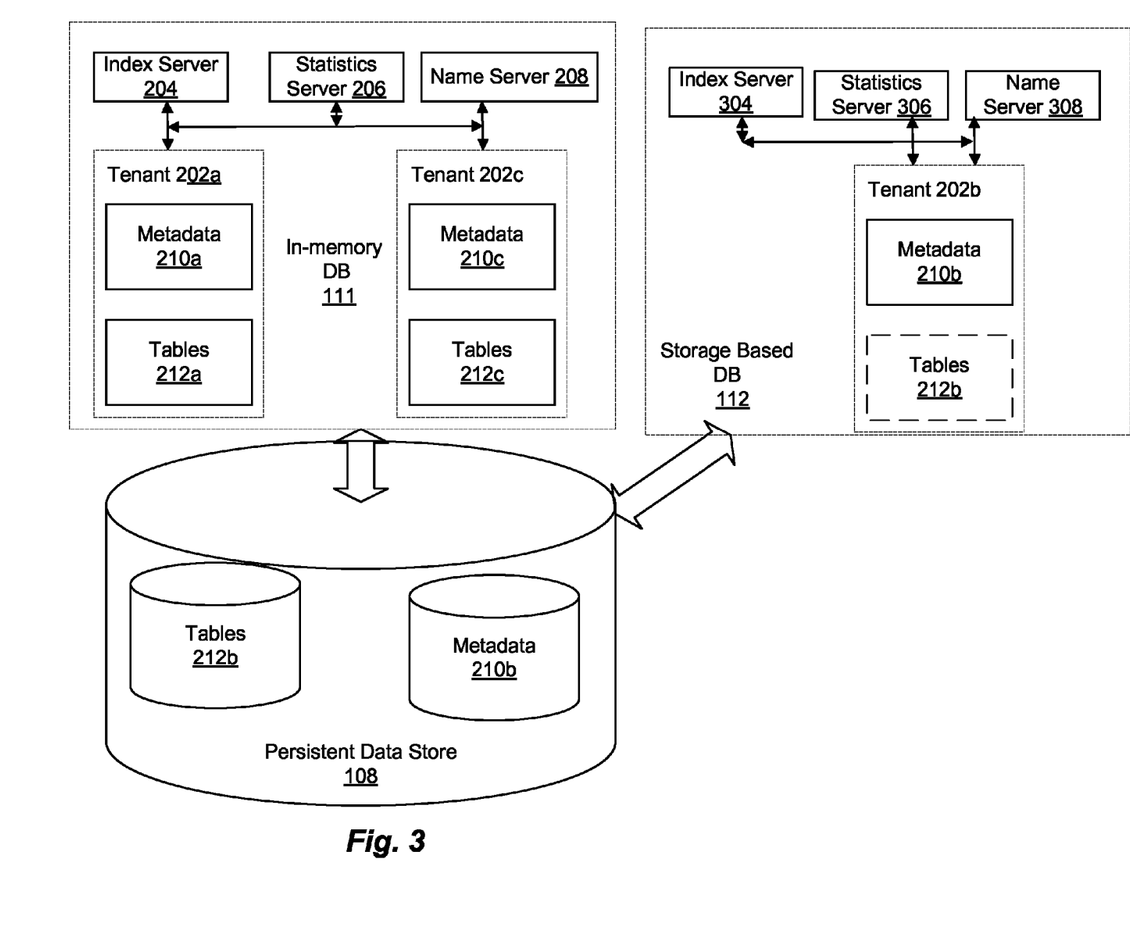
FIG. 3 is a schematic representation of an illustrative embodiment of a persistent data store, an in-memory data store, and a storage based data store of the system of FIG. 1.

FIG. 3 is a schematic representation of an illustrative embodiment of persistent data store 108, in-memory data store 111, and storage based data store 112. Storage based data store 112 includes an index server 304 that uses an index of the database for performing operations on the database. Storage based data store 112 also includes a statistics server 306 that generates alerts for system 100 when resource usage and statistical thresholds are violated. Storage based data store 112 also includes a name server 308 for processing names of databases to prevent naming conflicts.

Usage analysis engine 122 polls, on a scheduled or triggered basis, data stores 108, 111, and 112 for the current usage of the data stores 108, 111, and 112 of each customer. If a customer has very little to no usage in in-memory data store 111, usage analysis engine 122 triggers the swap-out process of that customer's data and metadata from in-memory data store 111 to persistent data store 108. The metadata and other database handles may also be redirected to storage based data store 112, such as in the case of some activity by the user of the database. Usage analysis engine 122 may also contain a rule engine that can trigger the tenant remapping from in-memory data store 111 to persistent data store 108 or remapping from persistent data store 108 to in-memory data store 111 based on other criterion or criteria, such as conditions pursuant to a service level agreement. In some embodiments, the database may also be transferred from persistent data store 108 to storage based data store 112 if the database is sufficiently smaller, or there is sufficient time for the transfer before the next use.

In an illustrative embodiment, controller 130 determines that tenant 202b met the predetermined criterion or criteria for tenant 202b, and controller 130 moves the in-memory database from in-memory data store 111 to persistent data store 108. The databases for tenants 202a and 202c remain in in-memory data store 111. If customer corresponding to tenant 202b sends a query for tenant 202b, controller 130 may move tenant 202b into storage based data store 112, and metadata exchange agent 120 remaps the metadata 210b in metadata repository 124. Tenant 202b remains in persistent data store 108.

In various embodiments, the calls from usage analysis engine 122 to data stores 108, 111, and 112 are jdbc calls, whereas the calls to metadata exchange agent 120 and metadata repository 124 may be https calls of xml or json. In various embodiments, metadata exchange agent 120 negotiates the remapping of tenants 202 also via jdbc calls to data stores 108, 111, and 112. In various embodiments, during remapping, controller 130 exports user context from in-memory data store 111 and imports the user context into storage based data store 112, and metadata exchange agent 120 switches user flags in metadata repository 124 corresponding to the user context.

Controller 130 monitors conditions, such as usage, of persistent data store 108, in-memory data store 111, and storage based data store 112 to determine whether databases will be swapped between data stores 108, 111 and 112. The monitoring of in-memory data store 111 is described below in conjunction with FIG. 4. The monitoring of persistent data store 108 and storage based data store 112 is described below in conjunction with FIG. 5. Usage analysis engine 122 monitors for queries from application platform stack 104 and determines which of data stores 108, 111 and 112 has the database that is being queried and directs the query accordingly. The mapping of the query is described below in conjunction with FIG. 6.

Figure 4:
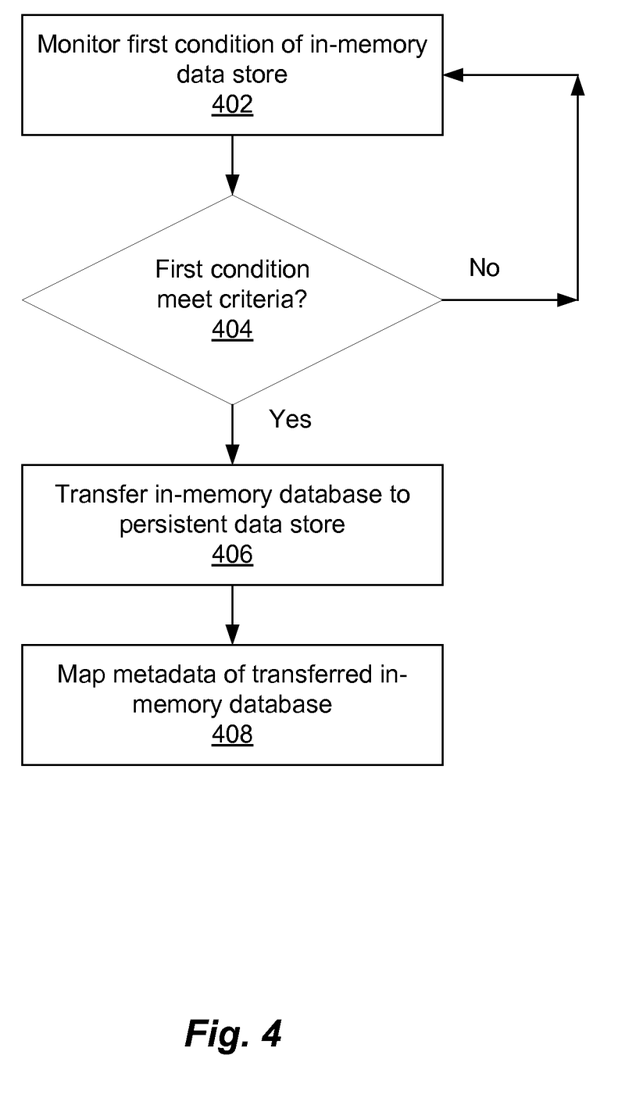
FIG. 4 illustrates a process for monitoring and transferring a database from an in-memory data store to a persistent data store and a storage based data store of the system of FIG. 1 according to an embodiment of the present invention.

FIG. 4 illustrates a process for monitoring and transferring a database from in-memory data store 111 to persistent data store 108. At 402, usage analysis engine 122 monitors in-memory data store 111 for a first condition of in-memory data store 111. The first condition may be, for example, a level of usage of in-memory data store 111 or a time period (e.g., time of day). At 404, usage analysis engine 122 determines whether the first condition of the in-memory database stored in in-memory data store 111 meets first defined criterion or criteria. For example, the time of day falls between 7 AM and 7 PM, or a level of usage exceeds a total data accessed in a time period. If the first condition does not meet the first defined criterion or criteria at 404, usage analysis engine 122 returns to monitoring in-memory data store 111 at 402. Otherwise, if the first condition does meet the first defined criterion or criteria at 404, usage analysis engine 122 transfers, at 406, the in-memory database to persistent data store 108 to store the database therein as a storage based database. At 408, metadata exchange agent 120 maps metadata of the in-memory database that was stored in in-memory data store 111 as being stored as a storage based database in storage based data store 112 by storing the metadata in metadata repository 124.

Figure 5:
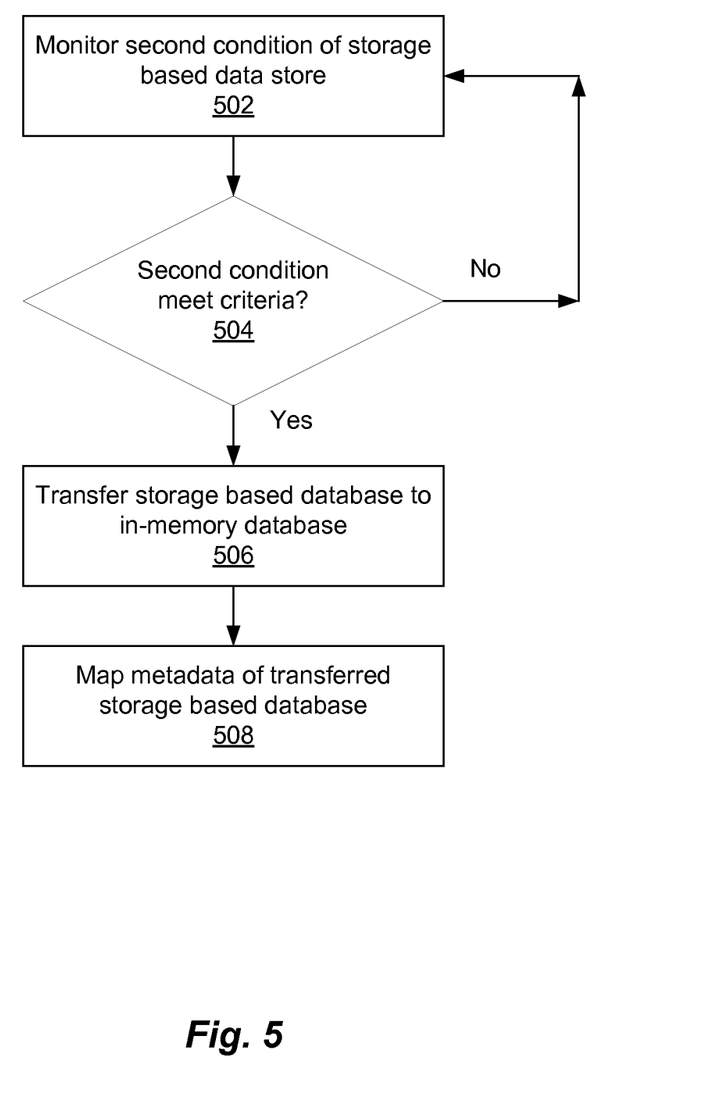
FIG. 5 illustrates a process for monitoring and transferring a database from a persistent data store and a storage based data store to an in-memory data store of the system of FIG. 1 according to an embodiment of the present invention.

FIG. 5 illustrates a process for monitoring and transferring a database from persistent data store 108 and storage based data store 112 to in-memory data store 111. For the sake of illustration, the process of FIG. 5 is described for storage based data store 112, but the process also applies to persistent data store 108. At 502, usage analysis engine 122 monitors storage based data store 112 for a second condition of storage based data store 112. The second condition may be, for example, a level of usage of storage based data store 112 or a time period (e.g., time of day). At 504, usage analysis engine 122 determines whether the second condition of the storage based database stored in storage based data store 112 meets second defined criterion or criteria. For example, the time of day falls between 7 PM and 7 AM, or a level of usage does not exceed a total data accessed in a time period. If second condition does not meet the second defined criterion or criteria at 504, usage analysis engine 122 returns to monitoring storage based data store 112 at 502. Otherwise, if the second condition does meet the second defined criterion or criteria at 504, usage analysis engine 122 transfers, at 506, the storage based database to in-memory data store 111 to store the database therein as an in-memory database. At 508, metadata exchange agent 120 maps metadata of the data storage database that was stored in storage based data store 112 as being stored as an in-memory database in in-memory data store 111 by storing the metadata in metadata repository 124.

Figure 6:
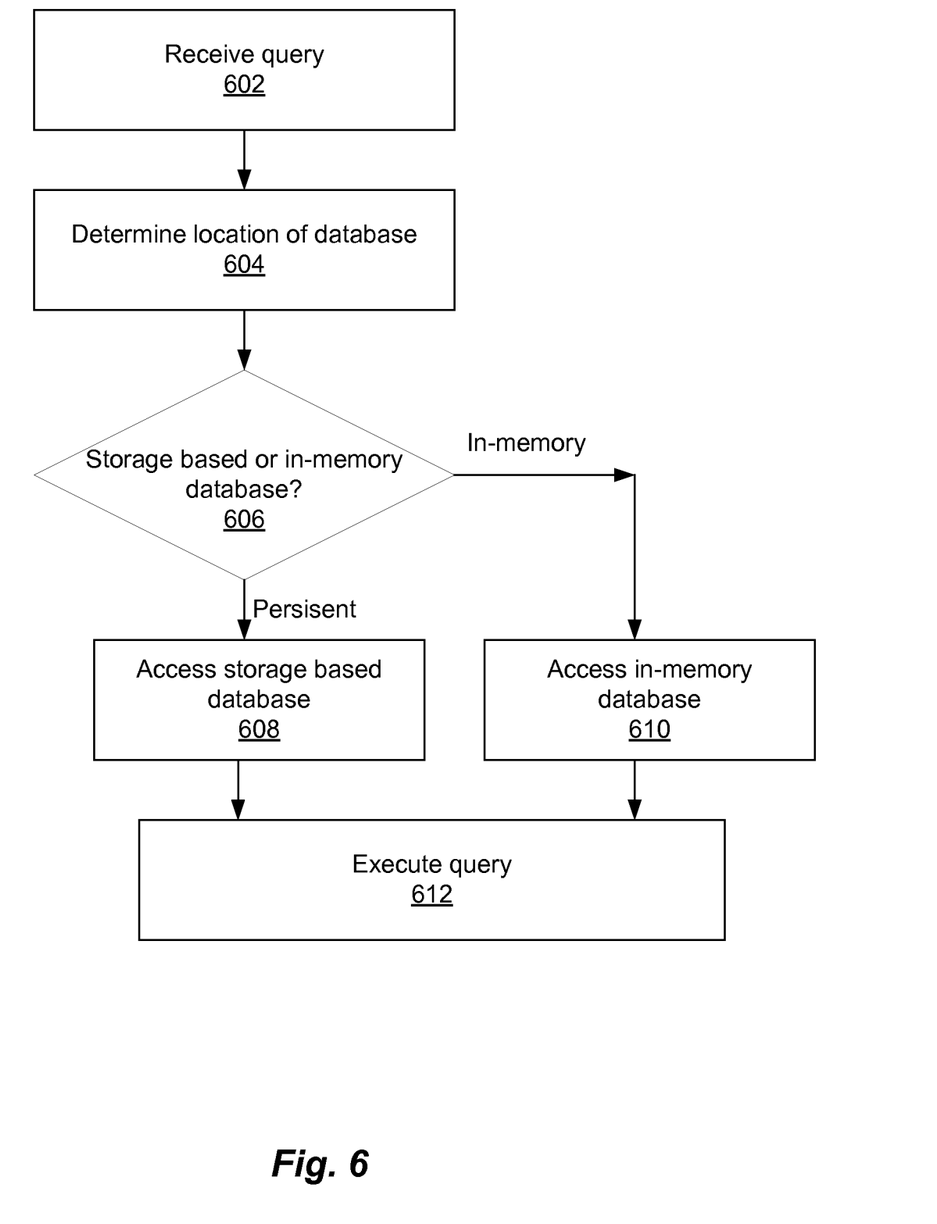
FIG. 6 illustrates a process for processing a query in the system of FIG. 1 according to an embodiment of the present invention.

FIG. 6 illustrates a process for processing a query in cloud 102. At 602, controller 130 receives a query from application platform stack 104. For the sake of illustration, the process of FIG. 6 is described for storage based data store 112, but the process also applies to persistent data store 108. At 604, controller 130 (or usage analysis engine 122) determines the location of the database that is being queried. For example, controller 130 (or usage analysis engine 122) determines whether the query is for data in storage based data store 112 or in-memory data store 111 by reading the metadata in metadata repository 124 that maps the location of the data. If, at 606, the query is a query of data in the storage based database of storage based data store 112, controller 130 accesses, at 608, storage based data store 112, and executes, at 612, the query. If, at 606, the query is a query of data in in-memory database of in-memory data store 111, controller 130 accesses, at 610, in-memory data store 111, and executes, at 612, the query.

Figure 7:
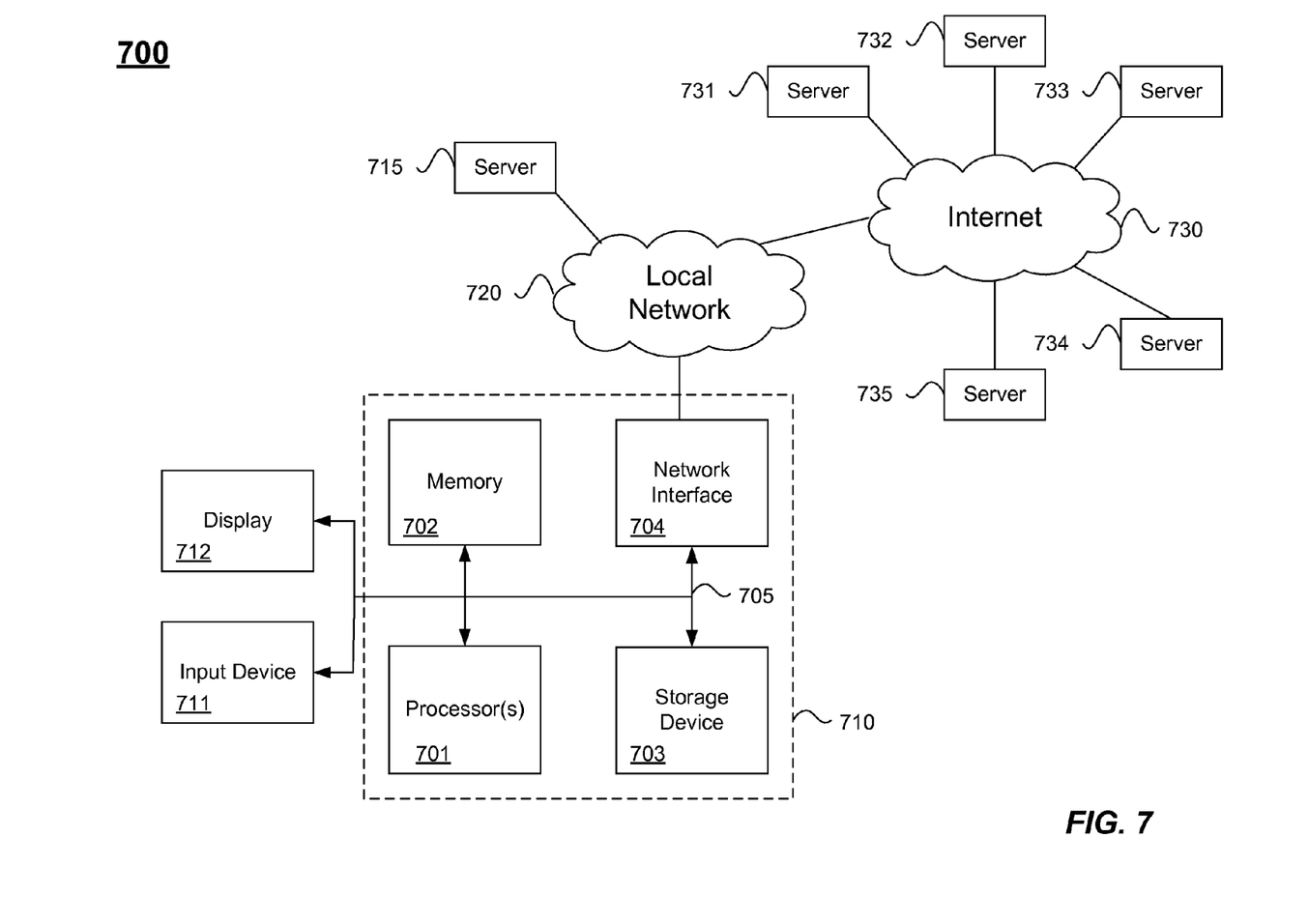
FIG. 7 illustrates hardware used to implement embodiments of the present invention.

FIG. 7 illustrates hardware used to implement embodiments of the present invention. An example computer system 710 is illustrated in FIG. 7. Computer system 710 includes a bus 705 or other communication mechanism for communicating information, and one or more processors 701 coupled with bus 705 for processing information. Computer system 710 also includes a memory 702 (e.g., main memory) coupled to bus 705 for storing information and instructions to be executed by processor 701, including information and instructions for performing the techniques described above, for example. This memory may also be used for storing variables or other intermediate information during execution of instructions to be executed by processor 701. Possible implementations of this memory may be, but are not limited to, random access memory (RAM), read only memory (ROM), or both. A machine readable storage device 703 is also provided for storing information and instructions. Common forms of storage devices include, for example, a non-transitory electromagnetic medium such as a hard drive, a magnetic disk, an optical disk, a CD-ROM, a DVD, a flash memory, a USB memory card, or any other medium from which a computer can read. Storage device 703 may include source code, binary code, or software files for performing the techniques above, for example. Storage device 703 and memory 702 are both examples of computer readable mediums.

Computer system 710 may be coupled via bus 705 to a display 712, such as a cathode ray tube (CRT), plasma display, or liquid crystal display (LCD), for displaying information to a computer user. An input device 711 such as a touch screen, keyboard and/or mouse is coupled to bus 705 for communicating information and command selections from the user to processor 701. The combination of these components allows the user to communicate with the system, and may include, for example, user interface 105. In some systems, bus 705 may be divided into multiple specialized buses.

Computer system 710 also includes a network interface 704 coupled with bus 705. Network interface 704 may provide two-way data communication between computer system 710 and the local network 720, for example. The network interface 704 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 704 sends and receives electrical, electromagnetic, or optical signals that carry digital data streams representing various types of information.

Computer system 710 can send and receive information, including messages or other interface actions, through the network interface 704 across a local network 720, an Intranet, or the Internet 730. Internet 730 may be used for data flow path 134. For a local network, computer system 710 may communicate with a plurality of other computer machines, such as server 715. Accordingly, computer system 710 and server computer systems represented by server 715 may be programmed with processes described herein. In the Internet example, software components or services may reside on multiple different computer systems 710 or servers 731-735 across the network. Some or all of the processes described above may be implemented on one or more servers, for example. Specifically, cloud 102 or elements thereof might be located on different computer systems 710 or one or more servers 715 and 731-735, for example. A server 731 may transmit actions or messages from one component, through Internet 730, local network 720, and network interface 704 to a component on computer system 710. Application platform stack 104 may be operated on computer system 710. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
    monitoring, by an in-memory database controller, a first condition of an in-memory database;
        wherein an in-memory data store stores the in-memory database;
    causing a separate metadata exchange agent to map metadata of the in-memory database into a metadata repository of a usage analysis engine upon determining that the in-memory database is stored in the in-memory data store;
    determining, by the in-memory database controller, whether the first condition of the in-memory database meets a first criterion defined by,
        a quantity of processing of the in-memory database,
        a size of the in-memory database,
        a time of day, and
        a term of use;
    upon determining that the first condition of the in-memory database meets the first defined criterion, storing, by the in-memory database controller, the in-memory database in a persistent data store;
    monitoring a second condition of the persistent data store;
    determining whether the second condition of the persistent data store meets a second defined criterion;
    upon determining that the second condition meets the second defined criterion, storing the in-memory database as a storage based database, wherein the second condition comprises a time period, and the second defined criterion comprises a sufficient time for transferring the in-memory database to the storage based database before a next use of the in-memory database;
    receiving a query in the in-memory database controller;
    in response to receiving an Extensible Markup Language (XML) or JavaScript Object Notation (JSON) Hypertext Transfer Protocol Secure (HTTPS) xml or json https call, the metadata exchange agent issuing a Java Database Connectivity (JDBC) Hypertext Transfer Protocol Secure (HTTPS) jdbc https call to remap metadata in the storage based database, and switching flags in the metadata repository corresponding to user context received from the in-memory database controller;
    upon determining that the query is a query of the storage based database, executing, by the in-memory database controller, the query using the storage based database; and
    reading the metadata including the switched flags in the metadata repository for executing the query.

2. The method of claim 1 further comprising:
    monitoring, by the in-memory database controller, a third condition of the storage based database;
    determining, by the in-memory database controller, whether the third condition of the storage based database meets a third defined criterion; and upon determining that the third condition of the storage based database meets the third defined criterion, storing, by the in-memory database controller, the storage based database in the in-memory data store as the in-memory database.

3. The method of claim 2 further comprising:

remapping metadata of the storage based database to the in-memory database upon determining that the storage based database is stored in the in-memory database.

4. The method of claim 2, wherein the third condition is a level of usage of the storage based database.

5. The method of claim 2, wherein the third condition is a time period.

6. The method of claim 1, wherein storing, by the in-memory database controller, the in-memory data base in a persistent data store further comprises:

exporting user context from the in-memory database;
importing the user context into the storage based database; and
switching user flags in a metadata repository corresponding to the user context.

7. A non-transitory computer readable medium embodying a computer program for performing a method, said method comprising:

monitoring, by an in-memory database controller, a first condition of an in-memory database;
wherein an in-memory data store stores the in-memory database;
causing a separate metadata exchange agent to map metadata of the in-memory database into a metadata repository of a usage analysis engine upon determining that the in-memory database is stored in the in-memory data store;
determining, by the in-memory database controller, whether the first condition of the in-memory database meets a first criterion defined by,
a quantity of processing of the in-memory database,
a size of the in-memory database,
a time of day, and
a term of use;
upon determining that the first condition of the in-memory database meets the first defined criterion, storing, by the in-memory database controller, the in-memory database in a persistent data store;
monitoring a second condition of the persistent data store;
determining whether the second condition of the persistent data store meets a second defined criterion;
upon determining that the second condition meets the second defined criterion, storing the in-memory database as a storage based database, wherein the second condition comprises a time period, and the second defined criterion comprises a sufficient time for transferring the in-memory database to the storage based database before a next use of the in-memory database;
receiving a query in the in-memory database controller;
in response to receiving an Extensible Markup Language (XML) or JavaScript Object Notation (JSON) Hypertext Transfer Protocol Secure (HTTPS) xml or json https call, the metadata exchange agent issuing a Java Database Connectivity (JDBC) Hypertext Transfer Protocol Secure (HTTPS) jdbc https call to remap metadata in the storage based database, and switching flags in the metadata repository corresponding to user context received from the in-memory database controller;

upon determining that the query is a query of the storage based database, executing, by the in-memory database controller, the query using the storage based database; and reading the metadata including the switched flags in the metadata repository for executing the query.

8. The computer readable medium of claim 7 wherein the method further comprises:

monitoring, by the in-memory database controller, a third condition of the storage based database;
determining, by the in-memory database controller, whether the third condition of the storage based database meets a second defined criterion; and
upon determining that the third condition of the storage based database meets the third defined criterion, storing, by the controller, the storage based database in the in-memory data store as the in-memory data base.

9. The computer readable medium of claim 8, wherein the third condition is a level of usage of the storage based database.

10. A computer system comprising:

one or more processors;
an in-memory database controller, the in-memory database controller monitors a first condition of an in-memory database,
wherein an in-memory data store stores the in-memory database;
a separate metadata exchange agent mapping metadata of the in-memory database into a metadata repository of a usage analysis engine upon determining that the in-memory database is stored in the in-memory data store;
the in-memory database controller determines whether the first condition of the in-memory database meets a first criterion defined by a quantity of processing of the in-memory database, a size of the in-memory database, a time of day, and a term of use, and upon determining that the first condition of the in-memory database meets the first defined criterion, the in-memory database controller stores the in-memory data base in a persistent data store as a storage based database, receives a query in the in-memory database controller, in response to receiving an Extensible Markup Language (XML) or JavaScript Object Notation (JSON) Hypertext Transfer Protocol Secure (HTTPS) xml or json https call, the metadata exchange agent issuing a Java Database Connectivity (JDBC) Hypertext Transfer Protocol Secure (HTTPS) jdbc https call to remap metadata in the storage based database, and switching flags in the metadata repository corresponding to user context received from the in-memory database controller, and upon determining that the query is a query of the storage based database, the in-memory database controller executes the query using the storage based database reading the metadata including the switched flags in the metadata repository for executing the query; and
the usage analysis engine monitoring a second condition of the persistent data store, determining whether the second condition of the persistent data store meets a second defined criterion, upon determining that the second condition meets the second defined criterion, storing the in-memory database as a storage based database, wherein the second condition comprises a time period, and the second defined criterion comprises a sufficient time for transferring the in-memory database to the storage based database before a next use of the in-memory database.

11. The computer system of claim 10, wherein the in-memory database controller further monitors a third condition of the storage based database, and
wherein the in-memory database controller further determines whether the third condition of the storage based database meets a third defined criterion, and, upon determining that the third condition of the storage based database meets the third defined criterion, stores the storage based database in the in-memory data store as the in-memory database.

* * * * *